United States Patent [19]

Welch

[11] Patent Number: 4,474,493

[45] Date of Patent: Oct. 2, 1984

[54] DOWEL FASTENER AND JOINTS INCLUDING SAME

[75] Inventor: Montgomery J. Welch, Spring Lake, Mich.

[73] Assignee: Modular Systems, Inc., Fruitport, Mich.

[21] Appl. No.: 416,379

[22] Filed: Sep. 9, 1982

[51] Int. Cl.³ .......................... B25G 3/00; F16D 1/00; F16G 11/00

[52] U.S. Cl. .................................. 403/405; 403/292; 403/388; 403/408; 52/585

[58] Field of Search ............... 403/292, 297, 280, 406, 403/408; 52/727, 585

[56] References Cited

U.S. PATENT DOCUMENTS

| | | |
|---|---|---|
| 252,311 | 1/1882 | Goulding . |
| 423,666 | 3/1890 | Bryant . |
| 815,055 | 3/1906 | Weiss . |
| 825,069 | 7/1906 | Peirce . |
| 1,287,678 | 12/1918 | Hall . |
| 1,296,342 | 3/1919 | Tozzi . |
| 1,360,884 | 11/1920 | Cazenove . |
| 1,734,161 | 11/1929 | DuPlessius ...................... 52/585 X |
| 1,829,657 | 10/1931 | Jones . |
| 1,850,713 | 3/1932 | Fox . |
| 2,001,144 | 5/1935 | Krnunsky . |
| 2,648,247 | 8/1953 | Schmuziger . |
| 3,314,699 | 4/1967 | Taylor . |
| 3,430,403 | 3/1969 | Muse . |
| 3,432,978 | 3/1969 | Erickson . |
| 3,442,170 | 5/1969 | Roder et al. . |
| 3,512,034 | 5/1970 | Jenkins ........................... 52/585 X |
| 3,826,206 | 7/1974 | Ruggles . |
| 3,903,669 | 9/1975 | Pease, Jr. et al. . |
| 4,012,913 | 3/1977 | Scott . |
| 4,067,165 | 1/1978 | Timmons ............................. 52/585 |
| 4,093,389 | 6/1978 | Wibrow ............................ 403/280 |
| 4,158,335 | 6/1979 | Belcastro et al. . |
| 4,284,379 | 8/1981 | Chaiko . |
| 4,318,208 | 3/1982 | Borja et al. . |

FOREIGN PATENT DOCUMENTS

| | | |
|---|---|---|
| 2370882 | 7/1978 | France . |
| 205452 | 6/1939 | Switzerland . |
| 191416 | 1/1923 | United Kingdom . |
| 1025455 | 4/1966 | United Kingdom . |
| 1427010 | 3/1976 | United Kingdom . |

OTHER PUBLICATIONS

Catalog pages from "Elastic Stop Nut Corporation of America" dated Dec. 15, 1952; Illustrating roll pins having rectilinearly extending slots.

Modular Systems, Inc. catalog entitled "Mod-eez—Flexible Joint Structural Fastening System", Aug. 1980; Illustrates various fastening systems using slotted clips and shoulder screws as well as clam-type fastener on p. 9.

Primary Examiner—Wayne L. Shedd
Attorney, Agent, or Firm—Price, Heneveld, Huizenga & Cooper

[57] ABSTRACT

A dowel fastener for frictionally engaging the sides of recesses, bores or apertures in wood, metal, and/or plastic joint members to hold the joint members together is disclosed. The dowel has a flexible, resilient, compressible tubular body with a spiral slot extending along its length. At least one end of the dowel is tapered and preferably includes inwardly angled, segmented, end flanges terminating in a circular, free end edge of smaller diameter than said body. The flanges lead the dowel into a reduced width or diameter recess or aperture upon assembly into a joint. The opposite end may also be tapered for insertion in a similar recess or include an apertured, planar end preferably formed from bent end flanges for securing the dowel to a surface with a screw or other fastener. Preferably, the diameter of the free end edge of the tapered end or ends is sized to prevent compressive insertion in an aperture or recess which is too small and would otherwise cause deformation or failure of the dowel.

30 Claims, 15 Drawing Figures

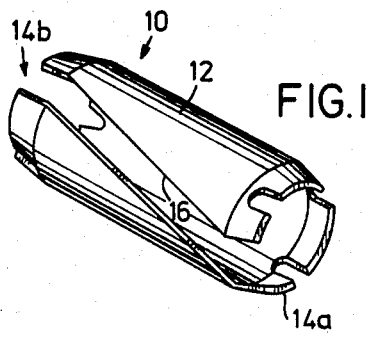
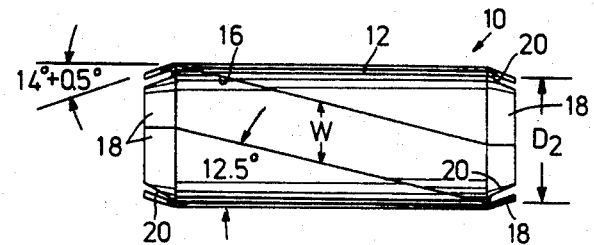
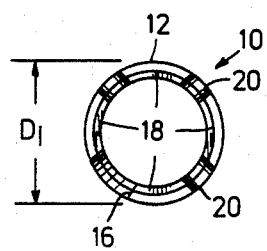
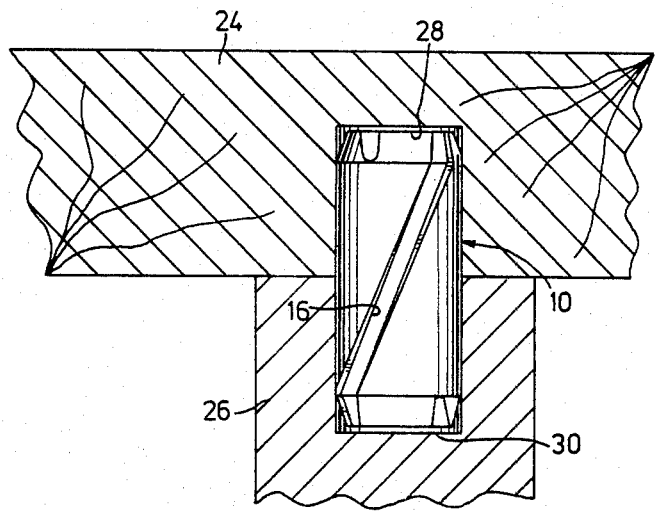
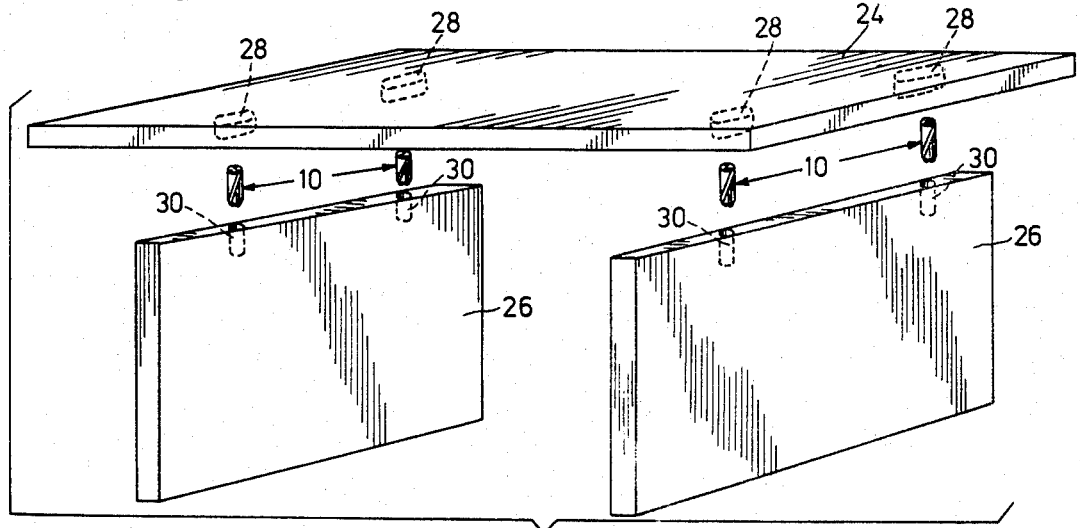

DOWEL FASTENER AND JOINTS INCLUDING SAME

BACKGROUND OF THE INVENTION

This invention relates to frictional type fasteners for joints including joint members of wood, metal, plastic or combinations thereof and, more particularly, to a dowel type fastener intended for compressive insertion within a recess, aperture or bore for frictionally engaging the sides of the recess, aperture or bore to hold the joint member to another member.

Dowel type fasteners for wood and other type joints are well-known. In the past, such dowel fasteners have either been solid and used for alignment purposes in conjunction with adhered or glued joints or have been slotted, solid or tubular dowels which frictionally engage the inside surfaces of bores or apertures in the joint members in which they are inserted. Although certain of the prior known slotted dowels or pins have included spiral or helical slots, the vast majority have included rectilinear slots. Such rectilinearly slotted dowels are less than satisfactory for furniture or other joints because, if inserted in a slot or elongated aperture, it is possible that the slot area of the circumference of such dowel could engage the side of the slot or aperture and produce a loose fit and less than satisfactory frictional holding power.

With respect to prior spiral or helically slotted dowels, they too have been less than satisfactory because of difficulty in inserting such dowels between joint members. Such dowels have been stiff and inflexible, due in part to the material thickness necessary for their strength.

In order to overcome insertion difficulties, certain prior, rectilinearly or saw-tooth slotted dowel fasteners have included tapered ends provided by either shearing their end surfaces or forming over the entire end surface of such dowel. In either case, the taper was insufficient to allow proper insertion of the relatively stiff dowel into two holes which might be slightly out of alignment in opposing joint members or sufficiently small to obtain a proper frictional hold in softer materials. In addition, such tapered ends on prior known dowels have tended to collapse when struck for insertion of the opposite end in a joint structure eliminating the ability to insert the collapsed end into its respective joint member. On the other hand, if the taper was sufficiently reduced to avoid such collapse, the aperture or bore size with which the stiff, slotted dowel could be used was severly limited.

Apart from the above, another common problem was the frequent insertion of slotted, dowel type fasteners in holes or apertures which were undersized. This caused complete closure of the slot in the dowel and/or over-compression and collapse of the dowel diameter itself or splitting of the joint member because of the small size into which the dowel was forced. The only way to prevent such collapse or deformation was to carefully regulate the bore size into which the dowel was fitted. The prior known dowels had no structure to prevent such insertion.

In addition to the above, a need was apparent in the fastener industry for a dowel fastener which could offer various levels of holding power, provide consistent frictional engagement force, be sufficiently flexible and resilient to allow insertion in varying hole or aperture sizes, allow insertion in slightly nonaligned or noncentric holes or apertures, and yet prevent insertion in holes or apertures which were undersized and would cause plastic deformation or failure of the dowel.

SUMMARY OF THE INVENTION

Accordingly, the present invention provides an improved dowel fastener for compressive insertion within a recess, bore or aperture to frictionally retain one joint member to another. The dowel fastener may be used for wood, metal, or plastic joints or joints made from combinations of such materials and includes a flexible, resilient, tubular body having a central axis, an angularly extending slot and two ends at least one of which is tapered. The tapered end includes at least one end flange formed in one piece with the body and extending inwardly toward the central axis at a predetermined angle and forming a partially-circular, free end edge of a second diameter less than that of the body. The slot is preferably spiral and extends from one end to the other along the dowel through both ends and the end flange. The body is sufficiently flexible to allow movement of the sides of the slot toward one another to reduce the dowel diameter such that the dowel is compressible from its normal, uncompressed diameter for insertion in a fastening aperture, recess or bore, yet sufficiently resilient for secure frictional engagement with the sides of the fastening aperture or bore. Depending on the embodiment, the invention prevents plastic deformation or failure of the dowel. Thus, portions of the slot sides, which may be at the tapered ends, abut upon sufficient compression to prevent over-compression and plastic deformation of the dowel. Alternately, or coupled with such slot portions, the size or diameter of the tapered end or ends prevents insertion in undersized bores or apertures to prevent such plastic deformation.

The dowel may be used in at least two embodiments, one embodiment including opposing, tapered ends formed from segmented end flanges, the other embodiment including a substantially planar end having an aperture therethrough, such end extending at substantially right angles to the central axis such that a fastening member like a screw may be received through the aperture to secure the fastener to a surface. The opposite end may then be received in a recess, bore or aperture in an opposite joint member.

Preferably, the diameter of the free end edge of the tapered end or ends is sufficiently large to prevent insertion of the dowel via its tapered end or ends in a fastening aperture recess or bore which would cause the slot sides to contact one another or be more over-compressed. Hence, in one preferred embodiment, the tapered end prevents insertion of the dowel fastener into recesses, bores or apertures which would cause plastic deformation, fracture or failure of the dowel itself. Alternately, or in addition, portions of the slot sides are adapted to abut one another upon sufficient compression to prevent plastic deformation or failure.

The invention also includes joint structures of varying types using the dowel fastener. The joints include the type described above as well as others including a substantially rigid, thin securing plate secured to a joint member for receiving the fastener. Each securing plate has an aperture with a diameter less than the normal, uncompressed outside diameter of the dowel but no smaller than the diameter of the tapered end. The securing plate is secured with its aperture in alignment with an aperture in the joint member. The dowel is then compressed and received through the securing plate aperture and into the joint member aperture such that the dowel frictionally engages the side of the aperture in the securing plate and retains the joint members together. Typical joint members can be upstanding panels for office partition purposes, furniture elements, or building walls.

The present dowel fastener provides significant advantages over prior known dowel fasteners. The dowel holds through frictional engagement forces between its outside surface and the surface of the wall of its mounting recess, aperture or hole. Thus, many levels of holding power can be offered by varying the length of the dowel, the thickness of the dowel stock and the diameter of the mounting recess, aperture or hole. Especially by varying the diameter of the mounting recess, aperture or hole, the amount of force required to disassemble the joint can be adjusted as desired.

The present dowel is especially well adapted for use in either hard or soft joint members, the latter including softer woods or plastic materials. The holding force can be appropriately adjusted to avoid splitting or opening of the recess or aperture. Significantly, in all type of joints using this dowel, the spiral slot distributes both the weak point of the dowel with respect to applied shear forces on the joint, as well as distributing the "flat" or reduced diameter of the fastener at the slot location so that the problems previously encountered with rectilinearly-slotted dowels or roll pins wherein the straight slot may end up in contact with the sides of the hole or aperture in one of the joint members and thus provide a very loose joint, are avoided.

In addition to the above, the spiral slot in the present invention allows movement of the two opposing edges along the slot in opposite directions parallel to the central axis of the dowel. Thus, when the dowel embodiment having two tapered ends is inserted in a hole, the diameter of the dowel near the noninserted end is several thousandths of an inch larger than the end which is in the hole. Thus, the noninserted end still has compression or holding power for eventual insertion into the mating part. The above advantages also allow the dowel to be used with two joint members having slightly nonaligned or nonconcentric mounting apertures because the present dowel can slightly flex or change direction for insertion in both of the apertures even though they are not completely in registry.

Finally, in certain embodiments of the present invention, destruction, failure or plastic deformation of the present dowel is avoided by the tapered ends which prevent insertion of the dowel into recesses, apertures or bores which are too small and over-compress the dowel. Thus, over compression, fracture and failure of the dowel is avoided. In a preferred embodiment taper of the ends of the present invention is also provided at a distinct angle and size such that the free end of the dowel which is struck to drive the opposite end into a joint member will not collapse and prevent insertion into the opposite joint member. Further, in such embodiment the taper is sufficient, even though strong in the above sense, to allow insertion into a small enough hole to provide sufficient holding power for the joint.

These and other, objects, features, purposes and advantages of the invention will become more apparent from a study of the following description taken in conjunction with the drawings.

BRIEF DESCRIPTION OF THE DRAWINGS

FIG. 1 is a perspective view of a first embodiment of the dowel fastener of the present invention;

FIG. 2 is a side elevation of the dowel fastener of FIG. 1;

FIG. 3 is an end elevation of the dowel fastener shown in FIGS. 1 and 2;

FIG. 4 is a perspective, exploded illustration of one joint application of the dowel fastener of FIGS 1-3 for securing parts of a furniture table together;

FIG. 5 is an enlarged, side sectional view of one of the furniture joints in the table of FIG. 4;

DESCRIPTION OF THE PREFERRED EMBODIMENTS

Figure 6:
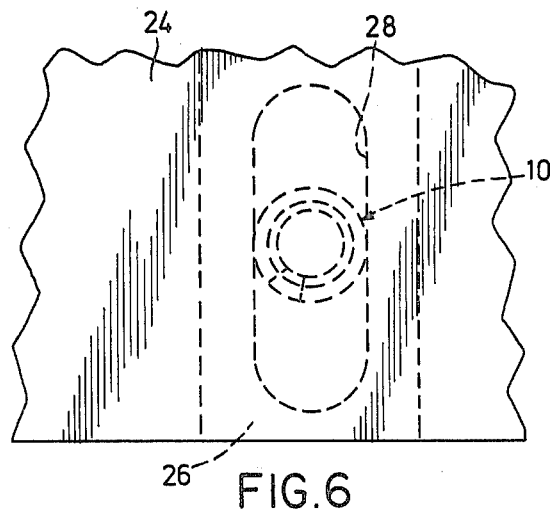
FIG. 6 is a top plan view of the joint of FIG. 5.

Referring now to the drawings in greater detail, FIGS. 1-3 illustrate a first embodiment 10 of the dowel fastener of the present invention. Generally, the dowel fastener of this invention may be formed with identical ends as shown in embodiment 10 and is designed for insertion into recesses, apertures or bores in two opposing joint members. Alternately, it may be formed with one tapered end and one partially-closed or flat end as shown in embodiment 50 of FIGS. 9-12 for attachment to a surface or shallow recess via a screw or other fastener and insertion into an aperture, bore or recess in a mating joint part. Both fasteners rely upon frictional engagement of the outer diameter of the dowel with the sides of the recess, aperture or bore for retention purposes. In both cases, the designed ability for compression and the inherent resiliency of the dowel of this invention create a secure and reliable joint.

As shown in FIGS. 1 and 2, dowel 10 includes a hollow, cylindrical, thin-walled, tubular body 12 having identically tapered ends 14a, 14b and an angled slot 16 extending from one end of the dowel to the other. The cylindrical body shape provides effective circumferential joint contact even when compressed as explained below. The entire dowel is preferably stamped and formed in one piece from a strip of spring steel in order to provide it with flexibility and resiliency.

As will be seen by comparing FIGS. 1, 2 and 3, the tapered ends 14a, 14b of dowel 10 include segmented end flanges 18 separated by notches or recesses 20 having rounded bottoms or closed ends at three positions and the spacing of slot 16 at one position. The notches allow proper inward bending of flanges 18 while maintaining their circular shape without bulges. Notches 18 are rounded to better distribute the stress which may focus at the bottom of the notches and thereby prevent stress cracking or failure of the dowel at that point. In addition, the rounded notches tend to avoid gouging of the recess, aperture or bore into which the dowel is inserted and, during manufacture as described below, the outside diameter of the dowel at the position of the notches is carefully controlled to prevent any raised areas or burrs from occurring which would otherwise cause such gouging.

As will be understood from FIG. 2, the segmented end flanges 18 extend inwardly at an angle to the central longitudinal axis of the cylindrical dowel preferably at an angle of 14°±0.5° as a manufacturing tolerance. In addition, the length of the flanges, is determined by the desired outside diameter of the free end edge of the end flanges which forms a partially-circular end surface having an outside diameter indicated at $D_2$ in FIG. 2. As will be seen by comparing FIGS. 2 and 3, the outside diameter $D_2$, is less than the outside diameter, $D_1$ (FIG. 3), of tubular body 12. That relationship remains true even when the dowel is compressed and inserted in a joint. However, as will be more fully explained below, in preferred embodiments the free end edge diameter, $D_2$, is carefully chosen to be slightly larger than the diameter of a recess, hole or aperture which would cause complete closure of the slot 16. Thus, insertion of the dowel into holes or recesses which are too small and which would overcompress and plastically deform or fracture the dowel is avoided.

As will be seen from FIG. 2, the angled slot 16 is preferably a spiral slot extending from one end of the body 12 to the other at a preferred angle of 12.5°±0.5° manufacturing tolerance with respect to the direction of the central axis and the sides of the cylindrical dowel. The slot 16 extends through the segmented end flanges to completely separate the dowel to allow compression in the indicated manner. The angular, spiral orientation of the slot effectively distributes and transmits shear forces on the joint when the dowel is in use. There is no single side or area weaker than another. Preferably, the opposing sides of the slot 16 are parallel along the length of the spiral slot in body 12. However, during manufacture, when the end flanges 18 are bent inwardly to form the tapered ends, the sides of the slot as it extends through the end flanges become nonparallel. Thus, the sides of the slot at the ends of the end flanges 18 will touch slightly before the remainder of the slot sides if the dowel were completely compressed and closed. This does not obstruct or alter normal function of the dowel since it is normally designed for compression only to a point before complete closure of the slot.

One example of a specific size of dowel 10 which has been found acceptable in joints utilizing wood, plastic or metal joint members has an overall length of 1.250 inches, including end flanges 18, an outside diameter for body 12 of 0.4687 inches, and a slot width of 0.175 inches. The slot extends at the 12.5°±0.5° angle to the central axis as mentioned above. The end flanges extend inwardly at an angle of 14°±0.5°, beyond the end of the tubular body by 0.110 inches, and inwardly to an outside diameter, $D_2$, at the free end edge thereof of 0.4150 inches. The rounded notches 20 are 0.093 inches wide and 0.110 inches deep. The preferred ratio of stock thickness to tubular body outside diameter for dowel 10 is 0.43 although a thickness to diameter ratio within the range of 0.04 to 0.55 would be acceptable and function properly based on the present understanding of the invention. In addition, the end flange forming the tapered ends on dowel 10 could be angled slightly less if the stock thickness was increased slightly and could also be formed as one continuous end flange especially for thicker materials having less taper on their ends. The preferred material is 0.020 inch thick AISI C-1050 spring steel which is annealed and heat treated to a hardness of Rockwell C 40 to 45. A light oil coating is maintained on the dowel after formation.

As shown in FIGS. 4–6, one exemplary joint which can be assembled using the dowel 10 includes a pair of wooden joint members 24, 26 which may be the top and leg from a table or other furniture assembly. The top 24 of the furniture includes an elongated slot or recess 28 routed into the underside thereof and having straight sides spaced apart by a width less than that of the normal, uncompressed outside diameter, $D_1$, of the dowel 10. The opposite member 26 includes a straight sided cylindrical bore 30 drilled into the top end edge surface of the leg 26. The slot or recess 28 and bore 30 have depths which are slightly greater than one-half the length of dowel 10 such that, when inserted and compressed therewithin, the dowel will fit substantially equally into each bore with one-half extending into each without obstruction from the bottom of either slot 28 or bore 30.

In order to assemble the joint shown in FIGS. 4–6, the dowel 10 is first aligned with the cylindrical bore 30 such that one of the tapered ends is received in the bore and then driven downwardly until it is either slightly above the bottom of the bore or engages the bottom. Thereafter, the top 24 with the slot 28 is placed over the leg and pressed or driven downwardly until the surfaces of top 24 and leg 26 abut as shown in FIG. 5. The dowel can be moved within slot 28 for adjustment purposes. During such procedure, the insertion of dowel 10 into bore 30 or slot 28 causes a reduction in diameter and compression of the overall dowel such that the width of slot 16 is reduced as shown in FIG. 5. The natural resiliency of the fastener urges the dowel to expand thereby maintaining tight frictional engagement of the dowel with the sides of the bore and slot to retain the joint members together. It has been found that proper frictional engagement can be maintained with a slot such as that at 28 for some applications, and that a cylindrical bore, although providing a tighter fit, is not required for all joints. The flexibility of the dowel 10 will allow insertion even though the slot 28 and bore 30 are not truly axially aligned. Further, even though one-half of the dowel is inserted and thus compressed, the other half, because of the flexibility and resiliency of the dowel material, remains somewhat uncompressed thereby providing gripping power for the other half of the joint.

For the dowel 10 described specifically above, the preferred width of recess 28 or diameter of bore 30 is 7/16 of an inch or 0.4375 inches. However, it has been found that proper joint retention and operation can be maintained with a range of hole sizes from approximately 0.42 inches to approximately 0.45 inches. Thus, the slot width or bore diameter into which the dowel 10 is inserted is somewhat smaller than its normal, uncompressed, outside diameter, $D_1$, although the dowel can fit within a range of hole diameters or widths depending upon the disassembly strength desired.

Figure 7:
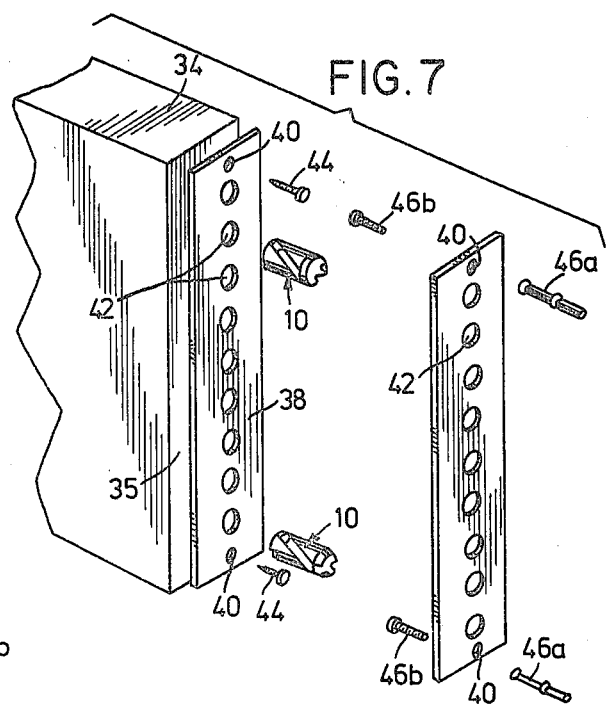
FIG. 7 is an exploded, perspective view of another type of joint using the dowel fastener of FIGS. 1-3.
Figure 8:
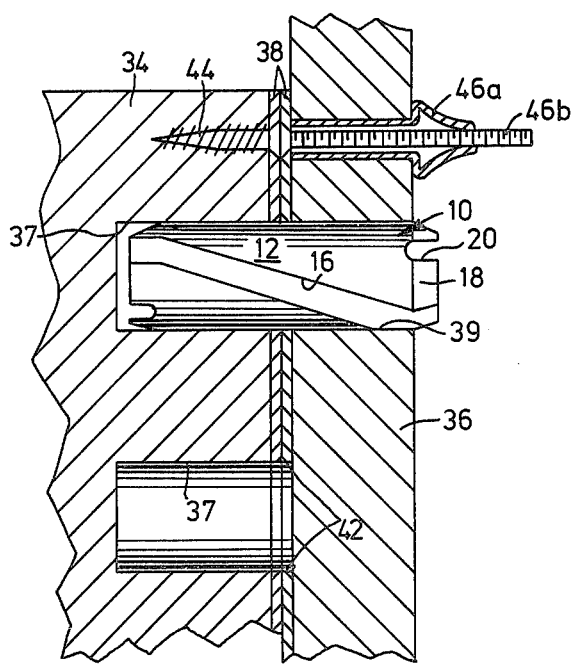
FIG. 8 is a side sectional view of one of the joints of FIG. 7.

Referring now to FIGS. 7 and 8, a different joint example using dowel 10 is illustrated. In this joint, a space dividing partition 34 is designed for attachment or joinder to an upstanding wall 36 such as in an office building or the like. Partition 34 includes a vertically extending end edge or face 35. A pair of identical securing plates 38 each formed from a thin, rigid material such as sheet steel, hard plastic or the like is then secured, one to the face 35 of the partition and the other to the vertically extending wall surface. Each securing plate 38 includes a securing aperture or apertures 40 for attachment of the plate to a joint member and at least one securing aperture 42 designed for receipt of the dowel 10. As shown in FIGS. 7 and 8, securing plates 38 actually include a plurality of series of aligned securing apertures 42 such that one or more of them may be chosen for insertion of a plurality of dowels 10 for better retention and a more secure joint. In this case, one plate 38 is secured to the vertical end edge of 35 of panel 34 with wood screws 44 while the opposing plate 38 is secured to the surface of wall 36 with appropriate molly fasteners and mating screws 46a, 46b designed for secure attachment in walls formed from dry wall, sheet rock or the like. Thereafter, a drill may be used to bore fastener-receiving apertures 37 in partition 34 or holes 39 through wall 36.

As will now be understood from FIG. 8, when the securing plates 38 are properly secured to the opposing faces of the joint members, dowel 10 is first aligned via one of its tapered ends with aperture 42 in the plate attached to wall 36 and driven inwardly such that approximately one-half of the dowel remains extending from the wall. Thereafter, partition 34 is aligned with the extending dowel 10 such that the dowel extends into one of the securing apertures 42 on the securing plate 38 on face 35 of the partition and the partition is then pressed into place such that it abuts the wall with dowel 10 extending through plate 38 into hole 37 extending behind plate 38 in the partition. Securing apertures 42 in securing plates 38 are sized in a manner similar to that for slot 28 and bore 30 as described above to be smaller than the normal, uncompressed outer diameter of dowel body 12, $D_1$. The principal holding power of the joint comes from the engagement of the exterior of dowel 10 with the sides of apertures 42 through the rigid plates, although some holding power also occurs due to engagement of the dowel with the sides of apertures 37 and 39. Removal of the partition from the wall is allowed by pulling the partition away from the wall with a force greater than the retention force of the dowel or dowel securing the partition to the wall.

As will also be understood, similar joints to that shown in FIGS. 7 and 8 but using a securing plate on only one of the joint members, i.e., partition 34 or wall 36, but not both, are fully possible with this invention. Such joints could be used for securing upholstered panels to chairs or other furniture or the like.

Figure 9:
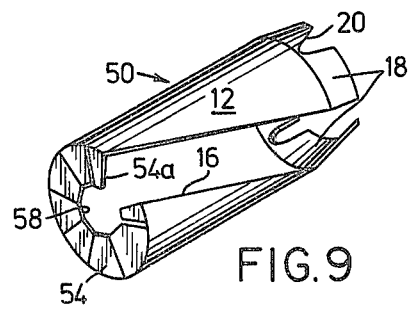
FIG. 9 is a perspective view of a second embodiment of the dowel fastener of the present invention.
Figure 12:
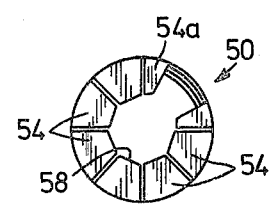
FIG. 12 is an end elevation of the partially-closed or flat end of the dowel fastener of FIGS. 9-11.
Figure 10:
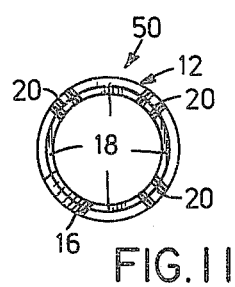
FIG. 10 is a side elevation of the dowel fastener of FIG. 9.
Figure 11:
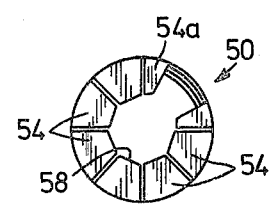
FIG. 11 is an end elevation of the tapered end of the dowel fastener of FIGS. 9 and 10.
Figure 13:
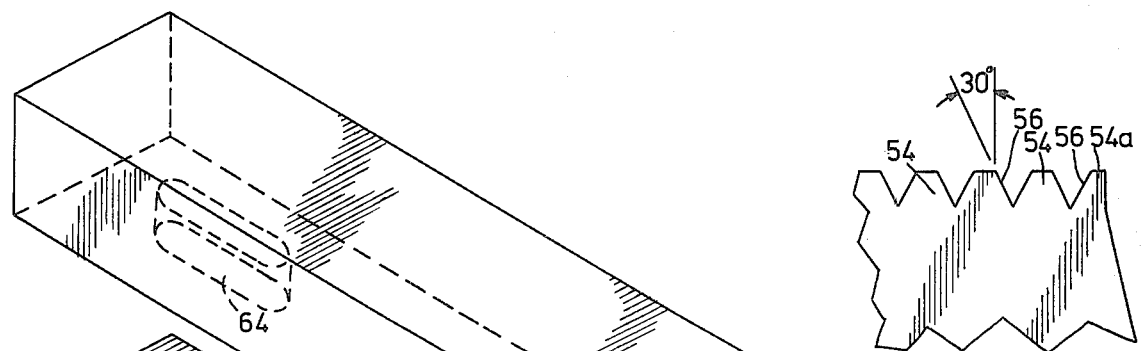
FIG. 13 is a fragmentary view of a stamped blank from which the dowel of FIGS. 9-12 is formed.

Referring now to FIGS. 9-12, a second embodiment 50 of the dowel fastener is illustrated. In embodiment 50, like numerals indicate like parts to those in embodiment 10. Embodiment 50 includes a substantially similar, tubular body 12 having one tapered end including segmented end flanges 18 and rounded notches 20 as described above in embodiment 10. In addition, slot 16 extends from the free end edge of flanges 18 along the length of body 12 in an angular or spiral fashion as in embodiment 10. However, the major difference in embodiment 50 is the inclusion of a substantially planar, semi-closed end 52. End 52 is formed from a plurality, preferably six full sized and two half sized, inwardly extending end flanges 54, 54a which, are arranged like flower petals and are narrower than end flanges 18 although also formed in the shape of truncated triangles like flanges 18. End flanges 54 are cut from a flat metal blank with V-shaped notches 56 therebetween in a sawtooth like fashion as shown in FIG. 13. Flanges 54a are substantially one-half the size of flanges 54. As shown in FIGS. 9, 10 and 12, flanges 54, 54a are bent over during formation such that they extend at a right angle to the central axis of the tubular body to define a central fastening aperture 58 through which a securing screw may be passed to secure dowel 50 to a surface or shallow recess for fastening purposes. As shown in FIG. 13, the preferred angle at which the sides of flanges 54, 54a extend to the direction of elongation of those flanges is 30°. The remaining dimensions of dowel 50 are the same as for dowel 10 except that flanges 54, 54a are 0.1840 inches wide at their juncture with body 12 while notches 56 are 0.110 inches deep. Also, aperture 58 has a minimum inside diameter of 0.219 inches.

Figure 14:
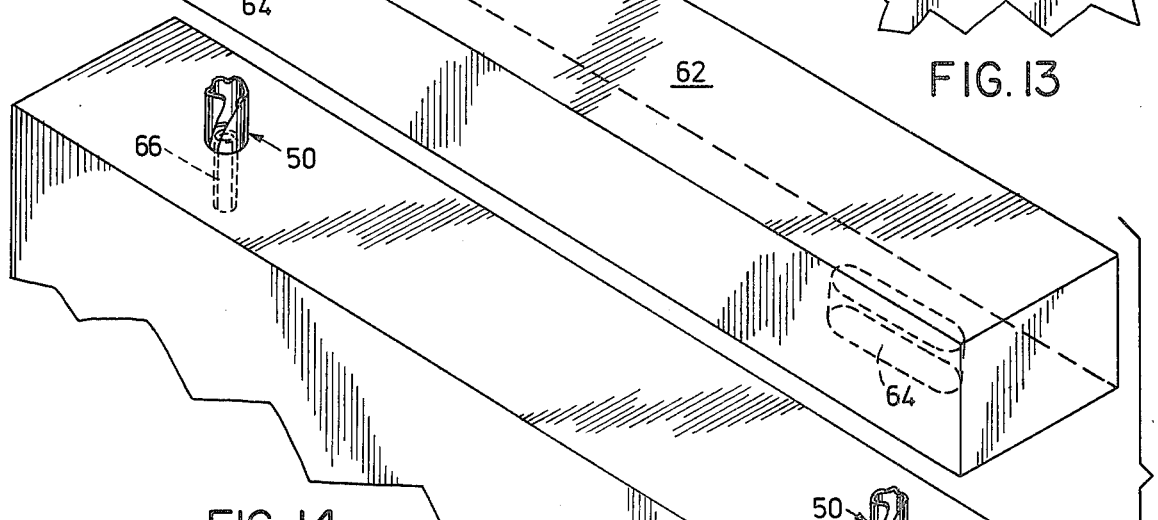
FIG. 14 is an exploded, perspective view of one joint using the dowel fastener of FIGS. 9-12 with a wooden top cap secured to the top surface of an orifice or space dividing partition.
Figure 15:
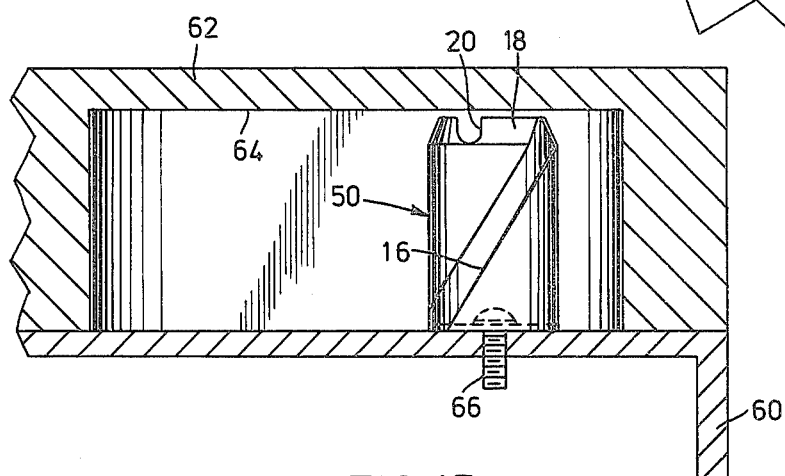
FIG. 15 is a side sectional view of one of the joints in the partition structure of FIG. 13.

As shown in FIGS. 13 and 14, an exemplary joint using dowel 50 is illustrated for joining two joint members including an upstanding office partition or space divider 60 formed from sheet metal or the like and an elongated piece of wooden trim or molding 62. Trim piece or top cap 62 includes a pair of spaced, elongated recesses or slots 64 similar in size and shape to slots 28 in furniture piece 24 and extending into the under surface of the trim piece, parallel to the elongated direction thereof. Secured to the horizontal top surface of partition 60 are a pair of semi-closed end dowels 50 of the type described above in connection with FIGS. 9-13. Each dowel 50 has its planar, semi-closed end 52 secured to the top surface 61 by a machine screw 66 extending through aperture 58 and into a tapped hole in the metal partition 60. For increased rigidity of the dowel 50, it is possible to secure it via semi-closed end 52 in a shallow, circular recess or the like which partially supports the sides of the tubular body 12 at their ends adjacent semi-closed end 52. As will be seen from FIGS. 13 and 14, dowels 50 project upwardly such that top cap 62 may be pressed downwardly thereover into abutment with partition 60 and adjusted such that the end surfaces are flush via the elongated slots 64. As with the insertion of dowel 10 in the joints described above, the insertion of dowel 50 into slot 64 occurs via the tapered end flanges 18 closing or partially compressing the dowel to a smaller diameter such that it fits within the smaller diameter of slot 64 which has a width determined in accordance with the sizes noted above.

Each of the dowels 10, 50 is manufactured in substantially the same way by cutting a blank in the shape of a parallelogram from an elongated strip of sheet spring steel. The resulting parallel diagonal lines will form the opposing side edges of slot 16 when the blank is later rolled into the shape of the dowel while the parallel side edges of the blank are appropriately notched, either rounded or V-shaped, to form the segmented end flanges 18, 54, 54a when the dowel is formed as set forth below. The notches may be punched simultaneously with the cutting of the diagonal lines across the strip.

After forming the metal parallelogram blank noted above, each blank is rolled on a slightly undersized pin or mandrel to form it into a hollow cylinder or tube as noted. The mandrel or pin is oversized with respect to the overall width of the strip so that the slot will not be closed during formation. However, depending on the type of material and its resiliency, it is sometimes necessary to slightly undersize the pin or mandrel with respect to the desired size of the ultimate slot so that the natural resiliency of the material is accounted for and the slot is the right size after formation.

At the time the blank is formed around the pin or mandrel, the ends of the dowel are pinched or bent inwardly to form either the tapered ends or the semi-closed end. Forming the semi-closed end includes the additional step of bending or pressing flanges 54, 54a at a right angle to the central axis and into a substantially planar end. After such formation, the mandrel or pin around which the dowel is formed can be pulled from inside the dowel through an open end. In order to prevent further cold working of the material, it is sometimes necessary to employ a compressible pin or mandrel which is known in the metal forming industry and may have its diameter reduced for removal purposes.

Thereafter, the formed dowels are heat treated or annealed by heating and oil quenching to a hardness of Rockwell C 40 to 45. The final quench provides a light coating of oil which remains on the dowel. Thereafter, the formed treated dowels are tumbled to remove any roughness or burrs which may have resulted from the manufacturing process.

Accordingly, the present improved dowel fastener, in either of its embodiments, provides a secure frictional fastener for retaining two joint members together by compressive insertion within recesses, apertures or bores therein. The dowel is sufficiently flexible and resilient to be insertable in slightly nonaligned or varying size holes, includes a tapered end or ends and/or side portions adapted to abut upon sufficient compression to prevent insertion of the dowel in undersized holes which would fracture or cause plastic deformation of the dowel, provides enhanced force transmission of shear loads on the joint through use of its spiral or angular slot, and yet retains its round, cylindrical shape for proper joint surface engagement.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are as follows:

1. A dowel fastener for compressive insertion within apertures in joint members of wood, metal, or synthetic material to form a friction joint without permanent plastic deformation of the dowel comprising a flexible, resilient tubular body having a central axis, spiral slot, and two ends at least one of which is tapered;

said tapered end including at least one end flange formed in one piece with said body, extending inwardly toward said central axis at a predetermined angle and forming a circular free end edge of a second diameter less than that of said body;

said slot extending from end to end along said dowel through both ends and said end flange; at least portions of the sides of said slot abutting one another upon sufficient compression of said dowel;

said body being substantially uniform in diameter such that it presents a substantially uniform, cylindrical, exterior gripping surface for engagement with the sides of the joint apertures and being sufficiently flexible to allow only elastic movement of the sides of said slot toward one another without plastic deformation of said body to reduce the dowel diameter such that said dowel is compressible from its normal, uncompressed diameter for insertion in a smaller fastening aperture yet sufficiently resilient for secure frictional engagement of said exterior gripping surface with the sides of said fastening aperture.

2. The dowel fastener of claim 1 wherein said slot has a predetermined width when said dowel is at its normal, uncompressed diameter; said second diameter being sufficiently large to prevent insertion of said dowel via said tapered end in a fastening aperture or bore which would cause said slot to completely close.

3. The dowel fastener of claim 1 wherein said second diameter is slightly larger than the diameter of a bore or fastening aperture for receiving said dowel which would force said slot sides into contact with one another if said dowel was inserted therein whereby insertion in an aperture or bore which would cause failure of the dowel is avoided.

4. The dowel fastener of claim 1 or 2 wherein said end flange includes a plurality of segments, each segment extending inwardly at said predetermined angle and separated from the adjacent segments by a notch or said slot.

5. The dowel fastener of claim 4 wherein the closed ends of said notches are rounded to reduce cracking/failure of said dowel.

6. The dowel fastener of claim 1 or 2 wherein the other of said tubular body ends includes flange means extending inwardly toward said central axis with at least one portion thereof extending at a right angle to said axis; said flange means including a fastener receiving aperture through said one portion for attachment of said dowel to a surface.

7. The dowel fastener of claim 6 wherein said flange means include a plurality of tapered flange segments separated by notches, said flange segments extending in one-piece from said other body end and bent over at a right angle to said central axis such that said bent flange segments form a planar securing flange transverse to said axis, said aperture being centrally located in said securing flange.

8. The dowel fastener of claim 1 wherein said body is a thin-walled tube formed from annealed spring steel, said steel tube having a thickness to diameter ratio within the range of between about 0.4 and 0.55.

9. The dowel fastener of claim 1 or 8 wherein said end flange extends at an angle of about 14°±0.5° to said central axis.

10. The dowel fastener of claim 9 wherein said tubular body material has a thickness of 0.020 inches, said slot has a width of approximately 0.175 inches, the sides of said slot extending at an angle of about 12.5°±0.5° to the direction of said central axis.

11. A friction joint including the dowel fastener of claim 1 or 2 and first and second joint members, said joint members each including a bore in a surface thereof having a diameter less than the normal, uncompressed outside diameter of said dowel but no smaller than said second diameter; said dowel being inserted and compressed within each of said bores such that said dowel extends into and frictionally engages the sides of each bore to secure said joint member together.

12. The friction joint of claim 11 wherein each of said bores has a depth greater than one-half of the length of said dowel;
   said dowel extending into each bore a distance equal to substantially one-half its length; said joint members abutting one another.

13. A friction joint including the dowel fastener of claim 1 or 2, first and second joint members, and at least one securing plate formed from thin, substantially rigid material and having at least one aperture therethrough, said securing plate aperture having a diameter less than the normal, uncompressed, outside diameter of said dowel but no smaller than said second diameter; one of said joint members having at least one dowel receiving aperture in a surface thereof; said securing plate being secured to said one joint member such that said securing plate aperture is in alignment with said aperture in said one joint member; said dowel being compressed and received through said securing plate aperture and into said joint member aperture behind said securing plate; said dowel being secured to the other of said joint members whereby said dowel frictionally engages the sides of said aperture in said securing plate and retains said one joint member to the other joint member.

14. The friction joint of claim 13 wherein one of said joint members is a wall.

15. The friction joint of claim 14 wherein the other of said joint members is an upstanding panel.

16. The friction joint of claim 13 wherein a second securing plate like said one securing plate is secured to said other joint member, said other joint member also including a dowel-receiving aperture aligned with the securing plate aperture in said second securing plate; said dowel being received in said aperture in said second securing plate and into said aperture in said other joint member.

17. A friction joint including the dowel fastener of claim 1 or 2 and first and second joint members, at least one of said joint members including a fastener-receiving recess in a surface thereof having a width less than the normal, uncompressed outside diameter of said dowel but no smaller than said second diameter;
   said dowel being secured to the other of said joint members and inserted and compressed within said recess in said one joint member such that said dowel extends into and frictionally engages the sides of said recess to secure said joint members together.

18. The friction joint of claim 17 wherein said recess is elongated and has parallel sides.

19. The friction joint of claim 17 wherein said recess is a cylindrical bore.

20. The friction joint of claim 17 wherein both said joint members include at least one of said fastener-receiving recesses; said dowel being inserted and compressed within and frictionally engaging the sides of both said recesses to secure said joint members together.

21. A dowel fastener for compressive insertion within apertures in joint members of wood, metal, or synthetic material to form a friction joint without permanent plastic deformation of the dowel comprising:
   a flexible, resilient, hollow, cylindrical body having a central axis, opposing ends and a predetermined uncompressed diameter; said cylindrical body providing an exterior gripping surface for engagement with the sides of a joint aperture;
   means defining a slot extending angularly along said body for allowing only elastic flexing movement of said body sides for compressing the dowel to smaller diameters for insertion in smaller diameter apertures or bores of joints;
   end flange means on at least one end of said body providing a taper for inserting and compressing the dowel within a smaller diameter joint bore or aperture; said end flange means extending at a predetermined inward angle to said central axis and terminating at a free, curved end edge having a diameter less than said body diameter but larger than the diameter of a bore or aperture which would cause damage to the joint members or permanent deformation of the dowel upon insertion of the dowel.

22. The dowel fastener of claim 21 wherein said means defining said angularly extending slot extend in a spiral path along said tubular body.

23. The dowel fastener of claim 21 wherein said end flange means are included on both of said opposing body ends to facilitate insertion of said dowel in opposing bores or apertures of opposing joint parts.

24. The dowel fastener of claim 21 or 23 wherein said end flange means include a plurality of flange segments, each segment extending inwardly at said predetermined angle to said central axis and separated from the adjacent segments by a notch or said means defining said slot.

25. The dowel fastener of claim 21 or 23 wherein said other end of said tubular body includes means for securing said dowel to a surface such that it extends upwardly therefrom with its one tapered end free for insertion in a recess, bore or aperture of a separate joint member.

26. The dowel fastener of claim 21 wherein the other of said tubular body ends includes flange means for attachment of said dowel to a surface extending inwardly toward said central axis with at least one portion thereof extending at a right angle to said axis; said flange means including a fastener-receiving aperture through said one portion.

27. The dowel fastener of claim 26 wherein said flange means include a plurality of tapered flange segments separated by notches, said flange segments extending in one-piece from said other body end and bent over at a right angle to said central axis such that said bent flange segments form a planar securing flange transverse to said axis, said aperture being centrally located in said securing flange.

28. The dowel fastener of claim 21 wherein said means defining said slot include spaced, parallel side edges on said slot, said side edges extending in a spiral path along said body from one of said opposing ends to the other and extending through said end flange means such that said side edges are completely separated.

29. The dowel fastener of claim 28 wherein slot side edges include portions adapted to abut one another upon compression of said dowel before the remainder of the slot is completely closed.

30. The dowel fastener of claim 29 wherein said portions of said slot side edges are located at said end flanges.

* * * * *

UNITED STATES PATENT AND TRADEMARK OFFICE
CERTIFICATE OF CORRECTION

PATENT NO. : 4,474,493
DATED : October 2, 1984
INVENTOR(S) : Montgomery J. Welch It is certified that error appears in the above-identified patent and that said Letters Patent is hereby corrected as shown below:

Column 4, line 31:

"orifice" should be --office--

Column 7, line 15:

"of series" should be --or series--

Signed and Sealed this

Sixteenth Day of April 1985

[SEAL]

Attest:

DONALD J. QUIGG

Attesting Officer          Acting Commissioner of Patents and Trademarks